3,265,588
ANTIBIOTIC DANOMYCIN AND METHOD OF PRODUCTION
Hiroshi Kawaguchi, Masanori Okanishi, and Hiroshi Tsukiura, Tokyo, Japan, assignors to Bristol-Banyu Research Institute, Ltd., Tokyo, Japan, a corporation of Japan
Filed July 3, 1962, Ser. No. 207,316
2 Claims. (Cl. 195—80)

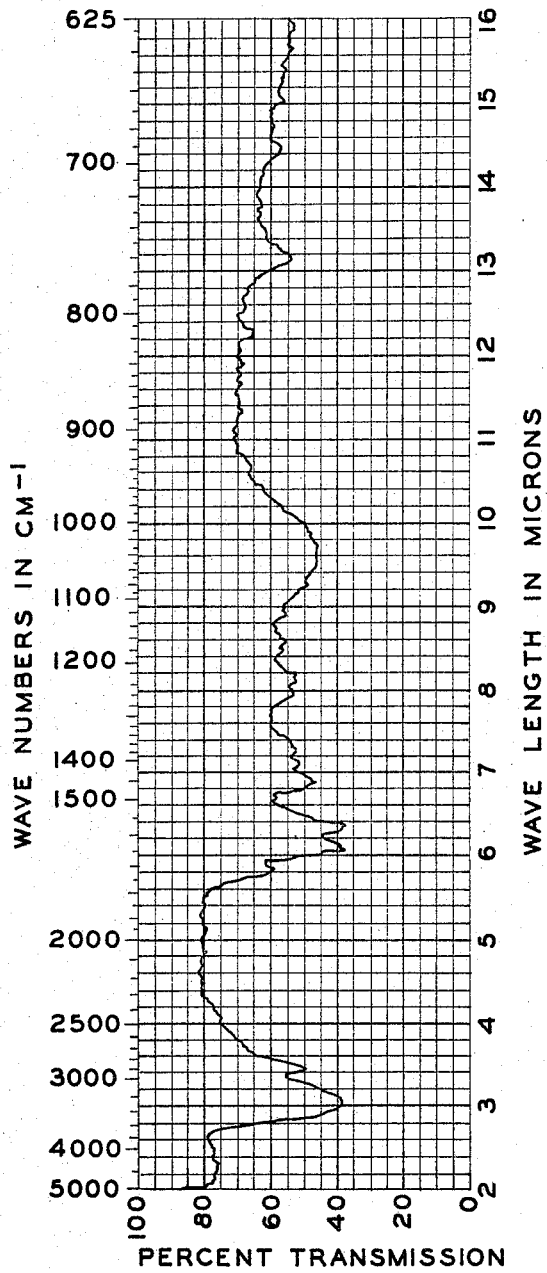
HIROSHI KAWAGUCHI
MASANORI OKANISHI
HIROSHI TSUKIURA  *INVENTORS.*
*BY* BRUCE B. CLYMAN
CURTIS W. CARLSON &
HERBERT W. TAYLOR JR.
ATTORNEYS.

This invention relates to a new and useful substance called danomycin and to processes for its production. More particularly, it relates to processes for its production by fermentation and methods for its recovery and purification. The invention embraces this antibacterial agent in dilute solutions, as crude concentrates, as purified solids and in pure crystalline form. Danomycin is effective in inhibiting the growth of Gram-positive bacteria, including particularly the staphylococci which are resistant to other antibiotics. Danomycin is nontoxic and exhibits a therapeutic effect in mice infected with Gram-positive bacteria. The clinical efficacy of danomycin has not yet been demonstrated. Danomycin belongs to the iron-containing group of antibiotics. Danomycin was originally called antibiotic No. 425.

There is now provided, according to the present invention, an antibiotic substance, danomycin, which is effective in inhibiting the growth of Gram-positive bacteria and which is soluble in water and insoluble in acetone, which is a reddish orange in color, which exhibits negative ninhydrin, Tollens and Fehling reactions and which in purified form melts with decomposition at 135–138° C., exhibits in water an ultraviolet absorption spectrum having maxima at $$270 \text{ m}\mu \ (E_{1\text{ cm.}}^{1\%}=48), \ 325 \text{ m}\mu \ (E_{1\text{ cm.}}^{1\%}=12.6)$$

and $$430 \text{ m}\mu \ (E_{1\text{ cm.}}^{1\%}=15.6),$$

is found by analysis to contain C, 48.82%; H, 7.05%; N, 7.81%; Fe, 3.13% and O (by difference), 33.19%; and when pelleted in potassium bromide exhibits characteristic absorption in the infrared region of the spectrum as shown in the drawing.

There is further provided, according to the present invention, the process for the production of an antibiotic substance, designated danomycin, which comprises cultivating a strain of *Streptomyces albaduncus* in an aqueous carbohydrate solution containing a nitrogenous nutrient under submerged aerobic conditions until substantial activity versus Gram-positive bacteria is imparted to said solution and then recovering said danomycin from said solution.

The drawing is a curve of the infra-red absorption spectrum of danomycin when pelleted in potassium bromide.

The organism producing the antibiotic of the present invention was isolated from a sample of soil and is a new species, designated *Streptomyces albaduncus*, of the genus *Streptomyces*. A culture of the living organism, given the laboratory designation No. 13246, has been deposited in the American Type Culture Collection, Washington, D.C., and added to its permanent collection of microorganisms as A.T.C.C. 14698.

The representative strain, No. 13246, of *S. albaduncus*, has the following characteristics:

(1) The aerial mycelium is short and wavy. Sporophores shows loops or hooks and rarely produces sinistrorse spirals. Structure of spore surface observed by electron microscope is spiny.

(2) Czapek's agar: The growth is pale yellowish brown and it grows penetrating into agar. White aerial mycelium is scant, and no soluble pigment is produced.

(3) Glycerin Czapek's agar: The growth is poor and pale yellowish brown, and it grows penetrating into agar. White aerial mycelium is scant, and it produces slightly pale yellowish brown soluble pigments.

(4) Glycerin ammonium salt agar: The growth is scant and yellowish white, and no aerial mycelium and no soluble pigment are produced.

(5) Glucose asparagine agar: Pale yellowish olive brown growth is glossy and it grows penetrating into agar. White aerial mycelium is powdery and apricot yellow soluble pigment is produced.

(6) Starch agar: Dark grayish brown growth is glossy and it grows penetrating into agar, and no aerial mycelium or soluble pigment is found. Starch is strongly hydrolyzed.

(7) Nutrient agar: Pale yellow growth is poor and it grows penetrating into agar. Neither aerial mycelium nor soluble pigment is found.

(8) Bennett's agar: Yellowish olive brown growth is moderate, powdery or velvety aerial mycelium is white or tinged with slightly brown, and yellowish olive brown soluble pigment is produced.

(9) Oatmeal soyton agar: Yellowish olive brown growth is moderate, white aerial mycelium is powdery or velvety and yellowish olive brown soluble pigment is produced.

(10) Potato plug: Pale yellowish brown growth is glossy but poor, neither aerial mycelium nor soluble pigment is formed.

(11) Gelatin stab: White colony grows on the surface, neither aerial mycelium nor soluble pigment is formed. Gelatin liquefaction is moderate.

(12) Tyrosine yeast gelatin stab: Pale yellow wrinkled colonial growth, scant aerial mycelium, and yellow soluble pigment are observed.

(13) Milk: Pale brown ring growth, no aerial mycelium and no soluble pigment are observed. Milk is not digested.

(14) Nitrate solution: Colorless pellet mass grows on the surface, and neither aerial mycelium nor soluble pigment is formed. Reduction of nitrate to nitrate is negative.

(15) Melanin formation media: Pale yellow growth is poor and it grows penetrating into agar. The aerial mycelium and soluble pigment are not produced.

(16) Carbon sources utilization was tested by the method of Pridham and the following results were obtained:

Good utilization was observed with arabinose, xylose, glucose, galactose, fructose, cellobiose, lactose, maltose, raffinose, sorbitol, inositol, mannitol, rhamnose, sodium citrate and sodium succinate. Utilizations of sorbose, sucrose and inuline were doubtful or negative.

When comparing with a number of streptomyces species reported to date, there are several strains which resemble *S. albaduncus* in some respects, such as *S. alboflavus*, *S. pseudogriseolus* and *S. griseolus*. But these species are able to be differentiated from the present strain because of the morphology of the sporophores, spore surface structures, cultural findings and physiological or biochemical properties as described below in detail.

S. alboflavus shows straight and branched aerial mycelium and scarcely produces spirals, and the color of aerial mycelium is yellowish white on Czapek's and no aerial mycelium is found on glucose asparagine agar. It reduces nitrate to nitrite, and peptonization of milk is positive without coagulation. These properties differentiate it from the present strain. S. pseudogriseolus shows numerous spirals in their sporophores, and color of aerial mycelium is dull yellow tinged with gray. Coagulation or peptonization are both positive on milk. In addition, differences are found in utilization of sodium citrate, raffinose and sorbitol. S. griseolus shows short straight sporophores with wavy branchings and no typical spirals which are similar to the present strain, but differences are observed in its smooth surface of spores, gray or dull gray color of aerial mycelium on Czapek's and glucose asparagine agar, and especially in its production of brown soluble pigment when grown on an organic media.

It is a common property of streptomycetes that their behavior on the culture medium changes spontaneously or may be changed artificially. Therefore mutants or variants which differ considerably from the original strain are sometimes obtained from soil or through preservation. Such properties are also found in the strains used in this invention.

When artificial mutations were induced in the original strain in order to improve productivity, considerably changed growth characteristics and color of aerial mycelium were observed in the mutants, which still also produced danomycin. As for procedures to induce mutation artificially, there are various physical or chemical ways such as irradiation of X-ray or ultraviolet-ray and treatments with chemicals such as nitrogen mustard. The following two strains are examples of mutation induced by irradiation of X-ray or ultraviolet-ray:

| Strain No. 13246-29 | Strain No. 13246-28-4-27 |
|---|---|
| Method of Mutation ||
| Ultraviolet-ray | X-ray |
| Microscopic observation (same as the original strain) ||
| Glucose asparagine agar ||
| Yellowish brown growth, white areial mycelium, pale yellowish brown soluble pigment. | Old gold growth, brownish white areial mycelium, old gold soluble pigment. |
| Starch agar ||
| Dark gray growth, white aerial mycelium, no soluble pigment. | Pale olive growth, light gray aerial mycelium, pale olive soluble pigment. |
| Bennett's agar ||
| Dark grayish yellow brown growth, gray aerial mycelium, yellowish brown soluble pigment. | Yellowish brown growth, light brownish gray aerial mycelium, yellowish brown soluble pigment. |
| Potato glucose agar ||
| Grayish yellow brown growth, gray aerial mycelium, pale yellowish brown. | Yellowish olive brown growth, white aerial mycelium, old gold soluble pigment. |

Hence, the present invention includes, besides the above species, its variants isolated from soil, mutants induced from them by mutating agents such as X-ray, ultraviolet-ray, chemicals and the like, and any strains isolated from soil based on the findings of the present invention so far as they fulfill the necessary requirements.

Danomycin is an antibiotic which contains iron in its molecule as described above. Therefore, the danomycin-producing strain was compared with several strains of streptomycetes which have been reported to produce such iron-containing antibiotics as grisein, albomycin, ETH-22765 and ferrimycin.

S. griseus, a producer of grisein, differs greatly from the present strain because the aerial mycelium shows characteristic water-green color, the sporophores are straight with tufts and typical spirals are not formed.

Several species of streptomycetes such as S. griseoflavus, S. galilaeus, S. lavendulae, S. pilosus, S. viridochromogenes, S. olivaceus, S. aureofaciens and S. polychromogenes are reported to produce iron-containing antibiotics and these species are differentiated as follows:

S. griseoflavus shows straight and monopodially branched sporophores, and does not form typical spirals. The growth color is reddish brown or orange on Czapek's agar, and citron yellow on glucose asparagine agar.

S. galilaeus has monopodially branched sporophores with irregular open spirals. Surface structure of the spores is smooth, and the growth is carmine to carmine red on glycerol Czapek's agar.

S. lavendulae shows long monopodailly branched sporophores with short compact spirals of dextrorse type, and the aerial mycelium is lavender on most media.

S. pilosus shows hairy spore surface and produces brown soluble pigment.

S. viridochromogenes has numerous spirals and produces brown soluble pigment.

S. olivaceus shows long spirals and forms ash gray to light olive gray aerial mycelium on Czapek's agar.

S. aureofaciens shows open spirals and forms ash gray or dark gray aerial mycelium on glucose asparagine agar.

S. polychromogenes shows pale carmine to carmine aerial mycelium.

As described above, the danomycin-producing strain was compared with related species from the viewpoints of taxonomy or of the producing antibiotic and it was concluded that the present strain is a new species of streptomycetes and it was designated as Streptomyces albaduncus nov. sp.

Streptomyces albaduncus when grown under suitable conditions produces danomycin. A fermentation broth containing danomycin is prepared by inoculating spores or mycelia of the danomycin-producing organism into a suitable medium and then cultivating under aerobic con on a solid medium is possible, but for production in large ditions. For the production of danomycin, cultivation quantity cultivation in a liquid medium is preferable. The temperature of the cultivation may be varied over a wide range, 20°–35° C., within which the organism may grow but a temperature of 25–30° C. and a neutral pH are preferred. In the submerged aerobic fermentation of the organism for the production of danomycin, the medium contains as the source of carbon a commercially available glyceride oil or a carbohydrate such as glycerol, glucose, maltose, sucrose, lactose, dextrin, starch, etc. in pure or crude states and as the source of nitrogen an organic material such as soybean meal, distillers solubles, peanut meal, cottonseed meal, meat extract, peptone, fish meal, yeast extract, corn steep liquor, etc., and, when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324 and in British Patents 730,341 and 736,325 and in United States Patents 2,691,618; 2,658,018; 2,653,899; 2,586,762; 2,516,080; 2,483,892; 2,609,329 and 2,709,672. In aerated submerged culture an antifoam such as liquid paraffin, fatty oils or silicone is used. More than one kind of carbon source, ntirogen source or antifoam may be used for the production of danomycin. Generally the cultivation is continued until at least several hundred mcg./ml. of danomycin is accumulated in the medium.

The general procedures for isolation and purification of a small amount of active compound from a fermentation beer can be applied for danomycin. For instance, by utilizing the different adsorbability, solubility and distribution coefficient between the active compound and the contaminating impurities, danomycin can be isolated. For example, danomycin in broth filtrate is adsorbed by active carbon, washed with water and aqueous methanol or aqueous ethanol and then eluted with aqueous butanol or aqueous acetone. The eluates are combined, concentrated in vacuo to dryness and crude powder is obtained. By utilizing carbon chromatography and a fraction collector, the active compound can be further purified. With the addition of a large quantity of a suitable organic solvent such as acetone to the aqueous concentrate of the active fractions, danomycin can be precipitated and separated. Contaminating impurities are precipitated and removed by adding a suitable organic solvent such as methanol or ethanol to an aqueous concentrate of the active fractions.

Extraction by organic solvents can also be used for the purification of danomycin.

For instance, the active compound can be extracted by suitable solvent mixtures such as phenol-chloroform or benzyl alcohol-butanol. The solvent extracts, after being washed with acidic water, alkaline water and water, can be transferred to water with the addition of suitable non-polar organic solvents such as ether or hydrocarbons.

Techniques of countercurrent distribution can also be applied for the purification of danomycin. For instance, by distribution between a solvent system of phenol-chloroform-pH 6.0 buffer (1:9:10) or of benzyl alcohol-butanol - N/100 - hydrochloric acid - 20% saline water (20:10:3:30), danomycin of high purity can be obtained.

By comparing the above-mentioned physiochemical and biological properties of danomycin with those of other known antibiotics, danomycin is shown to be a new antibiotic. Danomycin resembles grisein, albomycin, ferrimycin, LA-5352 and other iron-containing antibiotics in its water-soluble property and reddish orange color. But when comparing the antibacterial spectrum of danomycin with those of others, danomycin differs from grisein and albomycin in its activities against Gram-negative bacteria, from ferrimycin against *Bacillus sphericus* and from LA-5352 against *Hemolytic streptococci*.

Since danomycin is mainly active against Gram-positive bacteria, it was compared paper-chromatographically with other iron-containing antibiotics such as ferrimycin and LA-5352 which are also mainly active against Gram-positive bacteria. As shown below, danomycin differs from these antibiotics.

| Solvent System | $R_f$ Values | | |
|---|---|---|---|
| | Danomycin | Ferrimycin | LA-5352 |
| 3% NH₄Cl soln | 0.95 | 0.60 | 0.00, 0.35 |
| 50% aq. acetone | 0.85 | 0.65 | 0.60 |
| H₂O | 1.00 | 0.05 | 0.05 |
| Butanol-Acetic acid-H₂O (4:1:5) | 0.23 | 0.40 | 0.40 |
| Butanol-Acetic acid-H₂O (2:1:1) | 0.50 | 0.73 | 0.75 |
| Ethanol-H₂O (3:1) containing 2% NaCl | 0.65 | 0.45 | 0.45 |

In its infrared spectrum danomycin exhibits characteristic absorption maxima at 1160–1165, 865–880, 810, and 680–690 cm.⁻¹ which are not found in the spectra of ferrimycin or LA-5352.

When comparing the ultraviolet spectrum of danomycin with that of certain other antibiotics, danomycin differs from the others as follows:

LOCATION OF MAXIMA

Grisein _____ 265 mμ, 420 mμ.
Albomycin _____ 270 mμ, 440 mμ.
Ferrimycin _____ 228 mμ, 319 mμ, 425 mμ.
LA-5352 _____ None.
Danomycin _____ 270 mμ, 325 mμ, 430 mμ.

The following examples will serve to illustrate this invention without limiting it thereto:

*Example 1*

Constituents of medium:
    Soybean meal _____ g__ 15
    Dried horse blood _____ g__ 5
    Soluble starch _____ g__ 50
    Potassium phosphate, dibasic ____ g__ 1
    Sodium chloride _____ g__ 0.5
    Magnesium sulfate _____ g__ 0.5
    Calcium chloride _____ g__ 0.5
    Tap water _____ ml__ 1,000
    pH _____ 6.8

A culture medium (100 ml.) containing the above components was sterilized in a flask of 500 ml. volume, inoculated with a seed culture of *Streptomyces albaduncus* and cultivated at 27±1° C. for eight days with shaking, whereupon the production of danomycin in the fermentation broth reached 240 mcg./ml.

*Example 2*

Constituents of medium:
    Soybean meal _____ g__ 25
    Soluble starch _____ g__ 65
    Potassium phosphate, dibasic ____ g__ 1
    Sodium chloride _____ g__ 1
    Magnesium sulfate _____ g__ 0.5
    Calcium chloride _____ g__ 0.5
    Tap water _____ ml__ 1,000
    pH _____ 6.8

A culture medium (100 ml.) containing the above components was sterilized in a flask of 500 ml. volume, inoculated with a seed culture of *Streptomyces albaduncus*, and cultivated at 27±1° C. for eight days with shaking, whereupon the production of danomycin in the fermentation broth reached 440 mcg./ml.

*Example 3*

The fermentation broth was filtered, adjusted to pH 7–8 and adsorbed by 0.5% active carbon. The carbon was washed with water and then with 50% aqueous methanol and the danomycin was eluted with water saturated with n-butanol. The active eluate was concentrated to dryness and the crude solid danomycin thus obtained was dissolved in water and purified by carbon column chromatography. The column was washed with water and 50% aqueous methanol and then eluted fractionally with 60% aqueous acetone. The purer preparation thus obtained was again dissolved in a small amount of water and with the addition of ten volumes of acetone the danomycin was precipitated and then further extracted with 95% ethanol to remove a small amount of contaminating impurities. The reddish brown danomycin thus obtained was dissolved in water and extracted with a solvent mixture of phenol-chloroform (1:1). The solvent extract was washed by 0.5% aqueous solution of sodium bicarbonate, N/100 hydrochloric acid and water successively, and then transferred to water with the addition of ether and petroleum ether. A pure preparation of danomycin was thus obtained by freeze-drying.

*Example 4*

Danomycin can be purified by countercurrent distribution. Between a solvent system of benzylalcohol-n-butanol-N/100 hydrochloric acid-20% aqueous solution of sodium chloride (20:10:3:30), danomycin was distributed around a peak tube of No. 9 in thirty-five transfers. The contents of active tubes were collected and a pure preparation of danomycin was obtained by freeze-drying. Danomycin thus obtained was confirmed to be pure by the good agreement of its distribution curves plotted by the bioassay values and the absorbancies at 420 m$\mu$ with the theoretical curve.

Danomycin is a reddish orange colored antibiotic which contains iron in its molecule. It is soluble in water, 50% aqueous ethanol, 50% aqueous methanol and mixed solvent of phenol and chloroform, (1:1), and slightly soluble in 95% methanol and 95% ethanol, but insoluble in acetone and other organic solvents. Ninhydrin, Tollens and Fehling reactions are all negative, but several ninhydrin-positive substances are recognized by paper chromatography in the acid hydrolysate of danomycin. Countercurrent distribution technique is applied to danomycin in the system benzylalcohol-n-butanol-N/100 HCl-20% aqueous solution of NaCl (20:10:3:30) to obtain a pure preparation. Danomycin thus obtained melts at 135–138° C. with decomposition.

*Analysis.*—Found: C, 48.82; H, 7.05; N, 7.81; Fe, 3.13. On the basis of these analytical data and the assumption that only one atom of iron is present, the empirical and molecular formulae of danomycin is calculated to be $C_{73}H_{125}O_{37}N_{10}Fe$ and the molecular weight to be 1791.

The ultraviolet absorption spectrum of danomycin in water exhibits absorption maxima at 270 m$\mu$ ($E_{1\,cm}^{1\%}$=48), 325 m$\mu$ ($E_{1\,cm}^{1\%}$=12.6)

430 m$\mu$ ($E_{1\,cm}^{1\%}$=15.6)

The infrared absorption spectrum of danomycin pelleted in potassium bromide is shown in the drawing; characteristic absorption bands are found at the following wave numbers: 3200–3280, 2920, 1720–1725, 1630–1640, 1570–1580, 1495–1500, 1455–1470, 1220–1230, 1160–1165, 1010–1040, 865–880, 810, 755 and 680–690 cm.$^{-1}$.

When paper strip chromatography was carried out in various solvent systems, the following Rf values of danomycin were obtained: wet n-butanol, 0.05; 3% aqueous ammonium chloride, 0.95; 80% phenol, 0.95; 50% aqueous acetone, 0.85; n - butanol - methanol - water (4:1:2)+1.5% methylorange, 0.50; n-butanol-methanol-water (4:1:2), 0.30; benzene-methanol (4:1), 0.05; water, 1.0; n-butanol-acetic acid-water (4:1:5), 0.23; n-butanol-acetic acid-water (4:1:2), 0.35; n-butanol-acetic acid-water (2:1:1), 0.50; ethanol-water (3:1)+2% sodium chloride, 0.65; n-butanol-ethanol-acetic acid-water (25:25:3:47), 0.85. Danomycin exhibits the above-mentioned properties, and when comparing these properties with those of other iron-containing antibiotics such as grisein, albomycin, LA-5352 and ferrimycins, danomycin can be differentiated from these other antibiotics.

The biological properties of danomycin are as follows:

1. *Antimicrobial spectrum.*—The minimum inhibitory concentrations of danomycin against Gram-positive, Gram-negative, acid-fast bacteria and fungi were determined by serial agar dilution technique. The results are shown in Table 1. Danomycin is active against coagulase positive staphylococci including the strains resistant to commonly used antibiotics.

TABLE 1

| Test organism: | Minimum inhibitory concentration (mcg./ml.) |
|---|---|
| Escherichia coli NIHJ | >50 |
| Klebsiella pneumonia Julianelle Type A | >50 |
| Salmonella typhi | >50 |
| Shigella dysenteriae A | >50 |
| Neisseria sp. (CP*–R) | >50 |
| Staphylococcus aureus FDA 209–P | 0.039 |
| Staphylococcus aureus FDA 209–P) ST–R) | 0.039 |
| Staphylococcus aureus FDA 209–P (NB–R) | 0.078 |
| Staphylococcus aureus #52–34 (TC, EM, CM, Pc, SM–R) | 0.078 |
| Staphylococcus aureus Smith strain | 0.078 |
| Staphylococcus aureus 193 (Pc, SM–R) | 0.078 |
| Staphylococcus aureus 193 (Pc, SM, EM–R) | 0.078 |
| Staphylococcus albus PCI 1200 A | >50 |
| Sarcina lutea PCI 1001 | 0.313 |
| Micrococcus flavus | 0.019 |
| Bacillus subtilis PCI 219 | 0.039 |
| Bacillus sphericus 122 | 0.02 |
| Bacillus anthrasis: 115 | 0.02 |
| Bacillus cereus ATCC 10702 | >50 |
| Corynebacterium xerosis: 53–K–1 | <0.01 |
| Streptococcus faecalis B–40203 | >50 |
| Streptococcus hemolyticus Dick strain | >50 |
| Diplococcus pneumoniae DP–3–5A | <0.0024 |
| Diplococcus pneumoniae Type II | <0.0024 |
| Mycobacterium tuberculosis v. hominis $H_{37}RV$ | >50 |
| Mycobacterium tuberculosis 607 | >50 |
| Aspergillus niger | >50 |
| Candida albicans | >50 |

* Abbreviations: –R, resistant; CP, chloramphenicol; ST, streptothricin; NB, novobiocin; TC, tetracycline; EM, erythromycin; CM, carbomycin; Pc, penicillin; SM, streptomycin.

2. *Effect of pH on antibacterial activity.*—The effect was examined by dilution method in liquid media, inoculum size being $10^7$ dilution of overnight culture of test organisms. As shown in Table 2, the activity of danomycin was not influenced by media pH.

TABLE 2

| Test organism | Minimum inhibitory concentration (mcg./ml.) | | |
|---|---|---|---|
| | pH=6.2 | pH=7.2 | pH=8.2 |
| Staphylococcus aureus 209–P | 0.039 | 0.039 | 0.078 |
| Staphylococcus aureus 193 | 0.078 | 0.078 | 0.078 |
| Staphylococcus aureus Smith strain | 0.078 | 0.078 | 0.078 |
| Bacillus subtilis | 0.039 | 0.039 | 0.078 |

3. *Effect of serum on antibacterial activity.*—The effect was examined by broth dilution method. As shown in Table 3, serum does not exert any effect on the activity of danomycin.

TABLE 3

| Test organism | Minimum inhibitory concentration (mcg./ml.) | |
|---|---|---|
| | Control | With 50% serum |
| Staphylococcus aureus 209–P | 0.078 | 0.078 |
| Staphylococcus aureus 193 | 0.078 | 0.078 |
| Staphylococcus aureus Smith strain | 0.039 | 0.078 |

4. *Antibacterial activity of danomycin against clinically isolated coagulase positive staphylococci.*—The activities of danomycin and seven commonly used antibiotics were examined against 60 strains of coagulase positive staphylococci which had been isolated from patients in several hospitals. The results are summarized and shown in Table 4. The rather wide distribution of strains resistant to commonly used antibiotics was observed, while the distribution of strains resistant to danomycin was found to be only 1.7%.

TABLE 4

| Minimum inhibitory concentration (mcg./ml.) | Distribution of resistant staphylococci (percent) | | | | | | | |
|---|---|---|---|---|---|---|---|---|
| | Dano-mycin | DSM* | KM | Tc | CP | Pc | EM | NB |
| >100 | 1.7 | 55.2 | 0 | 52.5 | 0 | 30 | 0 | 0 |
| 100 | 0 | 10.4 | 0 | 6.8 | 1.7 | 43.5 | 3.3 | 1.7 |
| 10 | 0 | 22.4 | 3.3 | 1.7 | 98.5 | 11.7 | 0 | 1.7 |
| 1 | 10 | 12.1 | 93.5 | 32.2 | 0 | 3.3 | 97 | 52.5 |
| 0.1 | 87 | 0 | 3.3 | 6.8 | 0 | 0 | 0 | 44 |
| 0.01 | 1.7 | 0 | 0 | 0 | 0 | 11.3 | 0 | 0 |

*Abbreviations: DSM, dihydrostreptomycin; KM, kanamycin. Tc, tetracycline; CP, chloramphenicol; Pc, penicillin G; EM, erythromycin; NB, novobiocin.

5. *Toxicity.*—The toxicity of danomycin is extremely low, the intravenous $LD_{50}$ being 3,250 mg/.kg. in mice. no deaths occurred at an intraperitoneal dose of 5,000 mg./kg. in the same species. Chronic toxicity was examined in rats; even when 100 mg/kg. of danomycin was intraperitoneally injected into rats daily for 90 days, no adverse effects were observed in their growths or behavior.

6. *Chemotherapeutic effect against experimental infection on mice.*—Mice were infected intraperitoneally with *Staphylococcus aureus* Smith strain, inoculum size being 100 times the $LD_{50}$ of the pathogen, and danomycin was administered subcutaneously after the bacterial challenge. The median curative dose following single injection ($CD_{50}$) was found to be 0.04 mg/kg. For comparison, sodium penicillin G was examined side by side and the $CD_{50}$ value was found to be 0.3 mg/kg.

The antibiotic of the present invention is a useful agent for the detection of contamination by Gram-negative bacterial, fungi, yeasts and the like in the course of the commercial production of the enzyme amylase by fermentation of *B. subtilis*. Thus, the addition of 1 to 1000 mcg./ml., and preferably about 10 mcg./ml., of the antibiotic to an aliquot of inoculated medium followed by incubation, permits the growth of undesirable contaminants and their visual detection.

We claim:
1. The process for the production of an antibiotic substance, designated danomycin, which comprises cultivating a strain of *Streptomyces albaduncus* in an aqueous carbohydrate solution containing a nitrogenous nutrient under submerged aerobic conditions until substantial activity versus Gram-positive bacteria is imparted to said solution and then recovering said danomycin from said solution.
2. The process of claim 1 in which the organism is *Streptomyces albaduncus*, A.T.C.C. 14698.

References Cited by the Examiner
UNITED STATES PATENTS 3,210,246  10/1965  Haskell et al. _____ 167—65

OTHER REFERENCES

Grisein, J.A.C.S. 73 1770 (1951); Abomycin-Brit. Med. J. 2 1177 (1955)

Ferrimycin U.S. Patent 3,033,760, May 8, 1962.

JULIAN S. LEVITT, *Primary Examiner.*

L. B. RANDALL, *Examiner.*